United States Patent
Payne et al.

(10) Patent No.: US 12,090,013 B2
(45) Date of Patent: Sep. 17, 2024

(54) ORAL CARE PERSONAL CHALLENGES SYSTEM AND METHOD

(71) Applicant: Colgate-Palmolive Company, New York, NY (US)

(72) Inventors: Hannah Payne, Surrey (GB); Anne-Cecile Guilloteau, Brooklyn, NY (US); Rachel Van Pelt, Marlboro, NJ (US); Jason Steinberg, New York, NY (US)

(73) Assignee: Colgate-Palmolive Company, New York, NY (US)

( * ) Notice: Subject to any disclaimer, the term of this patent is extended or adjusted under 35 U.S.C. 154(b) by 102 days.

(21) Appl. No.: 16/949,636

(22) Filed: Nov. 9, 2020

(65) Prior Publication Data

US 2021/0177558 A1     Jun. 17, 2021

Related U.S. Application Data

(60) Provisional application No. 62/946,574, filed on Dec. 11, 2019.

(51) Int. Cl.
*A61C 17/22*     (2006.01)
*A46B 15/00*     (2006.01)
*G09B 19/00*     (2006.01)

(52) U.S. Cl.
CPC ........ *A61C 17/221* (2013.01); *A46B 15/0008* (2013.01); *A46B 15/0038* (2013.01);
(Continued)

(58) Field of Classification Search
CPC ....... A61C 17/22; A61C 19/04; A61C 17/225; A61C 17/22115; A61C 17/167;
(Continued)

(56) References Cited

U.S. PATENT DOCUMENTS 9,724,001 B2 * 8/2017 Dykes ................ A46B 15/001
2007/0270221 A1   11/2007 Park et al.
(Continued)

FOREIGN PATENT DOCUMENTS

CN          107072388        8/2017
CN          110188251        8/2019
WO     WO-2013007884 A1 *   1/2013  ........... G09B 19/003

OTHER PUBLICATIONS

Procter & Gamble, "Oral-B unveils new app technology at mobile world congress 2015," https://news.pg.com/press-release/oral-b/oral-b-unveils-new-app-technology-mobile-world-congress-2015 [accessed from the internet Jan. 9, 2020].
(Continued)

*Primary Examiner* — Katina N. Henson

(57) ABSTRACT

In one embodiment, the present disclosure is directed to a method for providing a personal toothbrushing challenge via an application of an electronic device. A user interface displays to a user of an electronic device, via a user interface, challenge parameters for creating a personal toothbrushing challenge, the challenge parameters including a type of challenge and a challenge period. The user interface receives from the user a parameter selection for each of the challenge parameters, each combination of parameter selections having a corresponding brushing expectation and point value. The electronic device receives brushing data from a user toothbrush indicative of user brushing activity, and determines, based on the brushing data, whether the user satisfied the brushing expectation corresponding with the combination of parameter selections. Upon determining that the user satisfied the brushing expectation, the user interface displays that the corresponding point value has been awarded to the user.

16 Claims, 5 Drawing Sheets

(52) U.S. Cl.
CPC .. *G09B 19/0084* (2013.01); *A46B 2200/1066* (2013.01); *A61C 17/225* (2013.01)

(58) Field of Classification Search
CPC ........ G09B 19/0084; A46B 2200/1066; A46B 15/0038; A46B 15/0008
See application file for complete search history.

(56) References Cited

U.S. PATENT DOCUMENTS

| | | | |
|---|---|---|---|
| 2008/0141478 | A1 | 6/2008 | Gatzemeyer et al. |
| 2009/0307859 | A1 | 12/2009 | Mottram et al. |
| 2010/0281636 | A1 | 11/2010 | Ortins et al. |
| 2012/0295216 | A1* | 11/2012 | Dykes .................. A61C 19/04 433/27 |
| 2014/0250612 | A1 | 9/2014 | Curry et al. |
| 2015/0044629 | A1 | 2/2015 | Wang et al. |
| 2017/0206804 | A1 | 7/2017 | Roszyk et al. |
| 2017/0303673 | A1 | 10/2017 | Van Gool et al. |
| 2018/0132604 | A1 | 5/2018 | Gatzemeyer et al. |
| 2018/0137773 | A1 | 5/2018 | Gatzemeyer |
| 2019/0313783 | A1 | 10/2019 | Serval et al. |

OTHER PUBLICATIONS

Tode, "P&G's Oral-B connected toothbrush integrates mobile rewards for smarter oral care," https://www.mobilemarketer.com/ex/mobilemarketer/cms/news/database-crm/22314.html, [accessed from the internet Jan. 9, 2020].

Flying Pictures, Web Blog, Zol.com.cn, "How to Keep Teeth Healthy—Philips Smart Sonic Electric Toothbrush, " https://www.toutiao.com/article/6465857452700074509/?wid=1713490122120, published Sep. 15, 2017, pp. 28, including English translation.

* cited by examiner

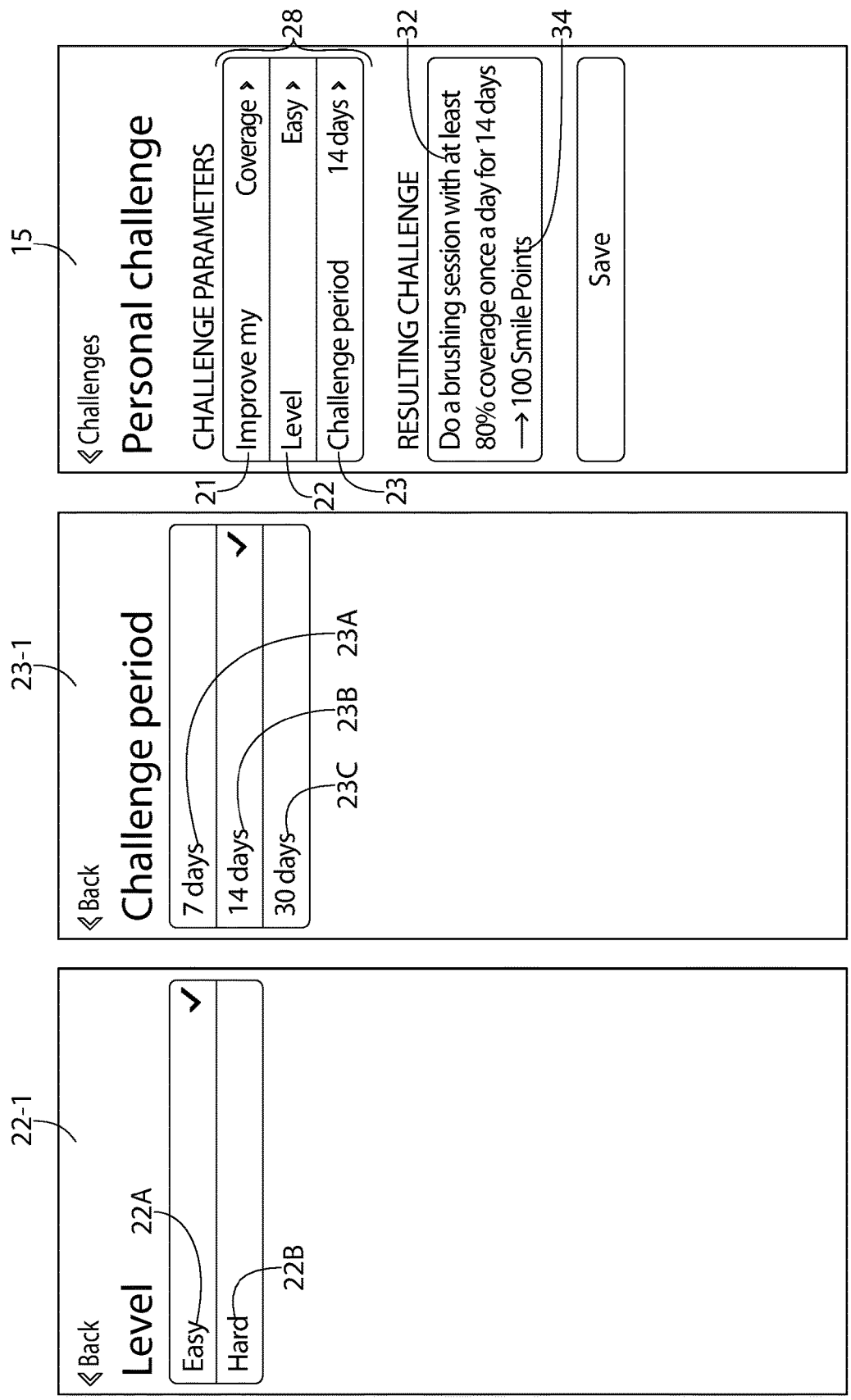

ORAL CARE PERSONAL CHALLENGES SYSTEM AND METHOD

CROSS REFERENCE TO RELATED APPLICATIONS

The present application claims the benefit of U.S. Provisional Patent Application No. 62/946,574 filed Dec. 11, 2019, which is incorporated herein by reference in its entirety.

BACKGROUND

Suggested toothbrushing routines can help a person improve his or her brushing effectiveness. But existing systems do not allow the user of the toothbrush to set a personal challenge based on specific, user-selected parameters. Further, existing systems do not allow the user to receive points based on the user's success in completing such a personal challenge. What is needed is a system that allows a user to create a personal challenge, defining parameters such as the challenge period of time and the intensity level, tracks progress, and awards the user when the challenge is met.

BRIEF SUMMARY

The present disclosure may be directed, in one aspect, to a method for providing a personal toothbrushing challenge via an application of an electronic device, the method including displaying to a user of an electronic device, via a user interface, challenge parameters for creating a personal toothbrushing challenge, the challenge parameters including a type of challenge and a challenge period; receiving from the user, via the user interface, a parameter selection for each of the challenge parameters, each combination of parameter selections having a corresponding brushing expectation and point value; receiving, at the electronic device, brushing data from a user toothbrush indicative of user brushing activity; determining, at the electronic device, based on the brushing data, whether the user satisfied the brushing expectation corresponding with the combination of parameter selections; and upon determining that the user satisfied the brushing expectation, displaying to the user, via the user interface, that the corresponding point value has been awarded to the user.

In another aspect, the present disclosure may be directed to a system for providing a personal brushing challenge, the system including a toothbrush comprising at least one tooth cleaning element; and a processor for generating brushing data indicative of user brushing activity; and an electronic device comprising a processor configured to perform the steps of displaying to a user of an electronic device, via a user interface, challenge parameters for creating a personal toothbrushing challenge, the challenge parameters including a type of challenge and a challenge period; receiving from the user, via the user interface, a parameter selection for each of the challenge parameters, each combination of parameter selections having a corresponding brushing expectation and point value; receiving the brushing data from the toothbrush; determining based on the brushing data, whether the user satisfied the brushing expectation corresponding with the combination of parameter selections; and upon determining that the user satisfied the brushing expectation, displaying to the user, via the user interface, that the corresponding point value has been awarded to the user.

In another aspect, the present disclosure may be directed to a non-transitory computer-readable storage medium encoded with instructions which, when executed on a processor, perform a method of displaying to a user of an electronic device, via a user interface, challenge parameters for creating a personal oral care challenge, the challenge parameters including a type of challenge and a challenge period; receiving from the user, via the user interface, a parameter selection for each of the challenge parameters, each combination of parameter selections having a corresponding oral care expectation and point value; receiving, at the electronic device, oral care data indicative of user oral care activity; determining, at the electronic device, based on the oral care data, whether the user satisfied the oral care expectation corresponding with the combination of parameter selections; and upon determining that the user satisfied the oral expectation, displaying to the user, via the user interface, that the corresponding point value has been awarded to the user.

In another aspect, the present disclosure may be directed to a method for providing an oral care challenge via an application of an electronic device, the method including displaying to a user of an electronic device, via a user interface, challenge parameters for creating a personal oral care challenge, the challenge parameters including a type of challenge and a challenge period; receiving from the user, via the user interface, a parameter selection for each of the challenge parameters, each combination of parameter selections having a corresponding oral care expectation and point value; receiving, at the electronic device, oral care data indicative of user oral care activity; determining, at the electronic device, based on the oral care data, whether the user satisfied the oral care expectation corresponding with the combination of parameter selections; and upon determining that the user satisfied the oral expectation, displaying to the user, via the user interface, that the corresponding point value has been awarded to the user.

BRIEF DESCRIPTION OF THE DRAWINGS

The present disclosure will become more fully understood from the detailed description and the accompanying drawings, wherein:

FIG. 4 is an intensity level user interface according to one embodiment of the present invention.

FIG. 5 is a challenge period user interface according to one embodiment of the present invention.

FIG. 6 is the personal challenge user interface of FIG. 2 where a brushing expectation has been generated based on selected challenge parameters.

DETAILED DESCRIPTION

Figures 1, 2, 3:
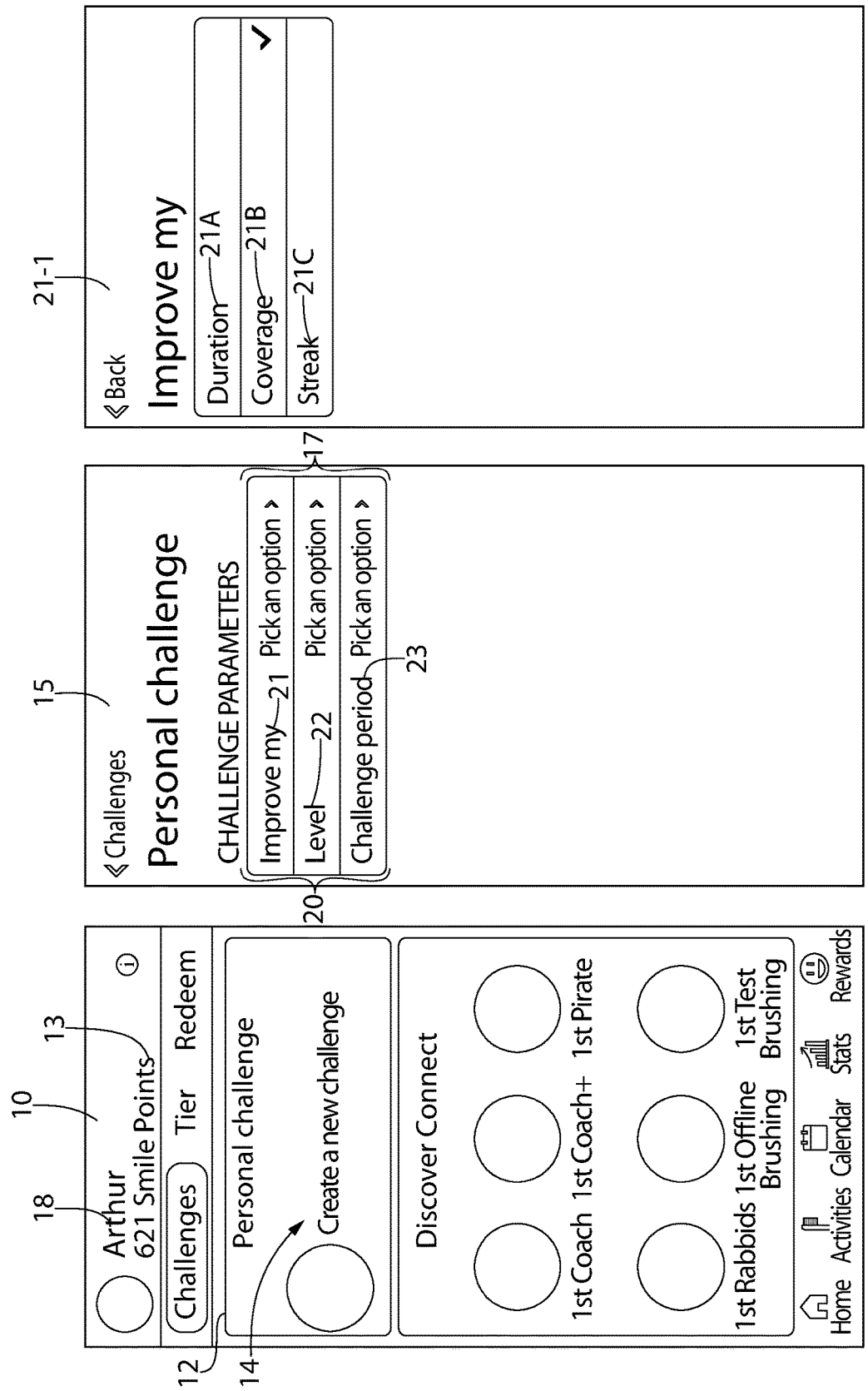
FIG. 1 is a challenges user interface according to one embodiment of the present invention.
FIG. 2 is a personal challenges user interface according to one embodiment of the present invention.
FIG. 3 is a type of challenge user interface according to one embodiment of the present invention.

The following description of the preferred embodiment(s) is merely exemplary in nature and is in no way intended to limit the invention or inventions. The description of illustrative embodiments is intended to be read in connection with the accompanying drawings, which are to be considered part of the entire written description. In the description of the exemplary embodiments disclosed herein, any reference to direction or orientation is merely intended for convenience of description and is not intended in any way to limit the scope of the present inventions. Relative terms such as "lower," "upper," "horizontal," "vertical," "above," "below," "up," "down," "left," "right," "top," "bottom," "front" and "rear" as well as derivatives thereof (e.g., "horizontally," "downwardly," "upwardly," etc.) should be construed to refer to the orientation as then described or as shown in the drawing under discussion. These relative terms are for convenience of description only and do not require a particular orientation unless explicitly indicated as such. The discussion herein describes and illustrates some possible non-limiting combinations of features that may exist alone or in other combinations of features. Furthermore, as used herein, the term "or" is to be interpreted as a logical operator that results in true whenever one or more of its operands are true. Furthermore, as used herein, the phrase "based on" is to be interpreted as meaning "based at least in part on," and therefore is not limited to an interpretation of "based entirely on."

As used throughout, ranges are used as shorthand for describing each and every value that is within the range. Any value within the range can be selected as the terminus of the range. In addition, all references cited herein are hereby incorporated by referenced in their entireties. In the event of a conflict in a definition in the present disclosure and that of a cited reference, the present disclosure controls.

Features of the present inventions may be implemented in software, hardware, firmware, or combinations thereof. The computer programs described herein are not limited to any particular embodiment, and may be implemented in an operating system, application program, foreground or background processes, driver, or any combination thereof. The computer programs may be executed on a single computer or server processor or multiple computer or server processors.

Processors described herein may be any central processing unit (CPU), microprocessor, micro-controller, computational, or programmable device or circuit configured for executing computer program instructions (e.g., code). Various processors may be embodied in computer and/or server hardware of any suitable type (e.g., desktop, laptop, notebook, tablets, cellular phones, etc.) and may include all the usual ancillary components necessary to form a functional data processing device including without limitation a bus, software and data storage such as volatile and non-volatile memory, input/output devices, graphical user interfaces (GUIs), removable data storage, and wired and/or wireless communication interface devices including Wi-Fi, Bluetooth, LAN, etc.

Computer-executable instructions or programs (e.g., software or code) and data described herein may be programmed into and tangibly embodied in a non-transitory computer-readable medium that is accessible to and retrievable by a respective processor as described herein which configures and directs the processor to perform the desired functions and processes by executing the instructions encoded in the medium. A device embodying a programmable processor configured to such non-transitory computer-executable instructions or programs may be referred to as a "programmable device", or "device", and multiple programmable devices in mutual communication may be referred to as a "programmable system." It should be noted that non-transitory "computer-readable medium" as described herein may include, without limitation, any suitable volatile or non-volatile memory including random access memory (RAM) and various types thereof, read-only memory (ROM) and various types thereof, USB flash memory, and magnetic or optical data storage devices (e.g., internal/external hard disks, floppy discs, magnetic tape CD-ROM, DVD-ROM, optical disk, ZIP™ drive, Blu-ray disk, and others), which may be written to and/or read by a processor operably connected to the medium.

In certain embodiments, the present inventions may be embodied in the form of computer-implemented processes and apparatuses such as processor-based data processing and communication systems or computer systems for practicing those processes. The present inventions may also be embodied in the form of software or computer program code embodied in a non-transitory computer-readable storage medium, which when loaded into and executed by the data processing and communications systems or computer systems, the computer program code segments configure the processor to create specific logic circuits configured for implementing the processes.

Referring now to the figures, FIGS. 1-6 show a method for providing a personal challenge according to one embodiment. FIG. 1 shows a challenges user interface 10. In the exemplified embodiment, the user interface forms part of an electronic device, and the electronic device is a mobile smartphone. In other embodiments, the electronic device may be any computer device capable of carrying out programs in accordance with the functions described herein (including a laptop computer, a desktop computer, a tablet, or a smartwatch). At the exemplified interface 10, a user 18 may receive a prompt 14 for a creating a new personal challenge. This prompt can be provided as part of a first instance of an application 14 for the electronic device. The invention is not limited to the exemplified method of initiating a personal challenge. For example, a user may initiate a personal challenge through a settings page or a personal statistics screen.

In the exemplified embodiment, the application 14 is a smartphone application (or "app"). In other embodiments, the application 14 can be any program for carrying out the functions described herein. Further, the exemplified user interface utilizes a touch screen provided by the smartphone, though in other embodiments the user interface can be any user interface capable of enabling a user to communicate with and carry out the functions described herein, including an interface utilizing a computer monitor, mouse, and/or keyboard.

The user interface 10 further shows the user's current points 13. The exemplified Smile Points are a digital currency and can be used for various purposes, such as special effects in games available through the app 12, discounts on products (oral care products and otherwise), and gift cards. In other embodiments, the points can be used for different purposes. Further, points may be replaced with any other measure of performance, including virtual money or a letter grade.

FIG. 2 is a personal challenges user interface 15 according to one embodiment of the present invention. At this screen, the user creates his or her personalized challenge. The exemplified parameters 20 are a type of challenge 21, an intensity level 22, and a challenge period 23. For each parameter 20, there is a prompt 17 to make a parameter selection from among different options. It is noted that these are only examples of challenge parameters, and other challenge parameters may be added, and any of the exemplified parameters may be omitted.

FIG. 3 is a type of challenge user interface 21-1 according to one embodiment of the present invention. At this screen, the user has selected the type of challenge parameter 21 from the personal challenge screen 15 of FIG. 2, and now chooses the type of challenge. In the exemplified embodiment, three options 21 are provided: a duration option 21A, a coverage option 21B, and a streak option 21C. Duration refers to a challenge regarding the length of time of each brushing session. Coverage refers to how thoroughly the user is brushing each portion of his or her teeth. Streak refers to how many days in a row a user has brushed according to a particular standard (e.g., a predetermined number of brushing sessions each day). It is understood that these are only example types and other types of challenges may be utilized. In FIG. 3, coverage option 21B is shown as selected.

FIG. 4 is an intensity level user interface 22-1 according to one embodiment of the present invention. At this screen, the user has selected the intensity level parameter 22 from the personal challenge screen 15 of FIG. 2, and now chooses the intensity level. In the exemplified embodiment, two intensity levels are provided. Selecting the easy option 22A will cause the resulting challenge to be less intense than if the hard option 22B is selected. It is understood that these are only example intensity levels and other types of intensity levels may be used, such as easy, medium, and hard, or numeric options (e.g., from 1 to 10). In FIG. 4, the easy option 22A is shown as selected.

FIG. 5 is a challenge period user interface 23-1 according to one embodiment of the present invention. At this screen, the user has selected the challenge period parameter 23 from the personal challenge screen 15 of FIG. 2, and now chooses the challenge period. In the exemplified embodiment, three challenge period are provided, namely, a 7-day option 23A, a 14-day option 23B, and a 30-day option 23C. This selection will determine how many days the challenge will last. It is understood that these are only example time periods and any other time periods (or other periods of measure) may be used. In FIG. 5, the 14-day option 23B is shown as selected.

FIG. 6 is the personal challenge user interface 15 of FIG. 2 where a brushing expectation 32 has been generated based on the selected challenge parameters 28. In the exemplified embodiment, each combination of parameters selections 28 has a corresponding brushing expectation 32 and point value 34. An example of the different combinations of parameter selections and resulting brushing expectations is shown in Table 1 below.

TABLE 1

Brushing Expectations and Corresponding Point Values

|  | 7 Day | 14 day | 30 day |
|---|---|---|---|
| Streak— Easy | 1 brush a day for 7 days (50 points) | 1 brush a day for 14 days (100 points) | 1 brush a day for 30 days (200 points) |
| Streak— Hard | 2 brushes a day for 7 days (100 points) | 2 brushes a day for 14 days (200 points) | 2 brushes a day for 30 days (400 points) |
| Coverage— Easy | Coverage above 80% once a day for 7 days (50 points) | Coverage above 80% once a day for 14 days (100 points) | Coverage above 80% once a day for 30 days (200 points) |
| Coverage— Hard | Coverage above 90% twice a day for 7 days (100 points) | Coverage above 90% twice a day for 14 days (200 points) | Coverage above 90% twice a day for 30 days (400 points) |

TABLE 1-continued

Brushing Expectations and Corresponding Point Values

|  | 7 Day | 14 day | 30 day |
|---|---|---|---|
| Duration— Easy | Brush for 2 mins once a day for 7 days (50 points) | Brush for 2 mins once a day for 14 days (100 points) | Brush for 2 mins once a day for 30 days (200 points) |
| Duration— Hard | Brush for 2 mins twice a day for 7 days (100 points) | Brush for 2 mins twice a day for 14 days (200 points) | Brush for 2 mins twice a day for 30 days (400 points) |

It is understood that the invention is not so limited, and that any variety of selected parameter options, brushing expectations, and corresponding point values may be used. In the exemplified embodiment, the resulting brushing expectation 32 is at least 80% coverage once a day for 14 days, with 100 Smile Points being awarded if the expectation is successfully completed.

It is further understood that any variety of parameters may be suggested to the user, and these suggested parameters can be provided at various screens, such as at a challenge screen or at a personal statistics screen of the app. The personal stats screen may tell you areas that require improvement (e.g., longer brushing sessions, better coverage, and/or higher frequency per day). Further, the challenge screen may be accessed at various screens, such as the personal statistics screen or the home screen of the app. The app can further allow sharing features, such as pushing challenges to others, or sharing progress with others. Such sharing can be performed through the app and/or other social media platforms. It is further noted that the app may be programmed to track the progress of the user as he or she attempts to complete the challenge. For example, a screen may display how many days of the challenge have been completed and how many days are left. Further, the app may be programmed to provide reminders to the user to carry out the brushing session(s) necessary for continuing the challenge. The app may also provide encouragement to the user through push notifications, text messages, or other means.

Figure 7A:
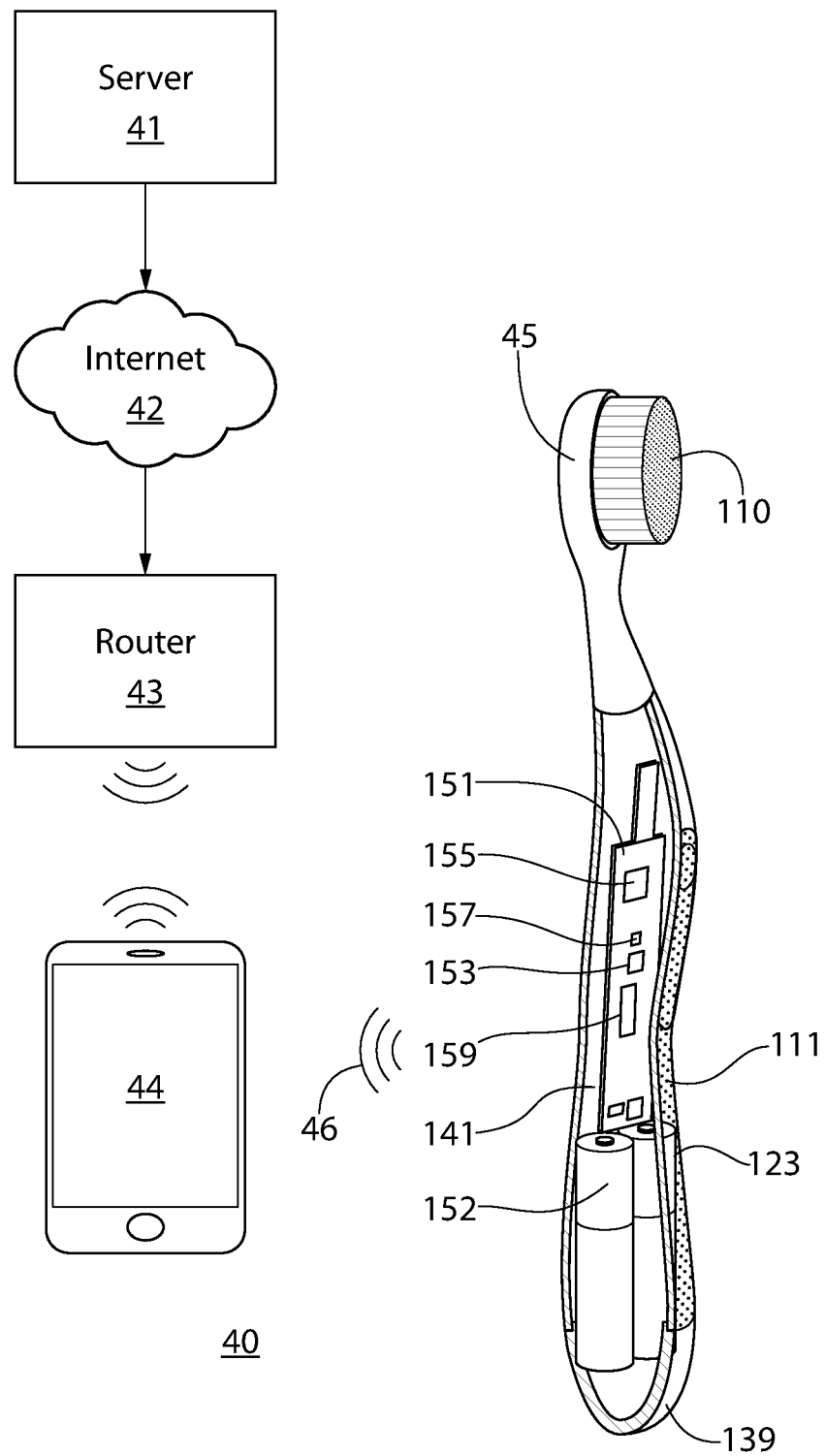
FIG. 7A is a system for providing a brushing challenge according to one embodiment of the present invention.

FIG. 7A is a system 40 for providing a brushing challenge according to one embodiment of the present invention. The exemplified system includes an electronic device 44 receiving brushing data 46 from toothbrush 45. The exemplified electronic device is a smartphone, though the invention is not so limited. The exemplified system 40 includes server 41 and router 43 connected to the internet 42. The server 41 (and other servers discussed herein) may be any computer or processor (or collection thereof) for carrying out programs in accordance with the functions described herein. In the exemplified embodiment, the server 41 communicates with the electronic device 44 through an internet connection, the router 43 providing wireless internet connection to the electronic device 44. In other embodiments, the server 12 can communicate with the respondent devices electronic device 44 through any standard communication means, including through use of a telecommunication network (e.g., 3G or 4G) or a wired internet connection (e.g., wired Ethernet cables). In yet other embodiments, different sets of discrete units of text are obtained by alternative means.

The exemplified toothbrush 45 includes a tooth cleaning element 110 and a handle 111. The handle 111 is a housing for containing an electronic circuit 151 and a power source 152. The handle 111 is a hollow structure in which the cavity 141 is formed. More specifically, in the exemplified embodiment, the cavity 141 is formed in the elongated gripping portion 123 of the handle 111. In the exemplary embodiment, the power source 152 is shown as two batteries located within the cavity 141. Of course, the invention is not so limited and more or fewer than two batteries may be used, or alternatively, other types of power sources may be used. A removable end cap 139 forms the proximal end of the handle 111 by engagement with the gripping portion 123 of the handle 111.

The exemplified brush 45 includes an electronic circuit 151. The electronic circuit 151 includes a processor 153 communicably coupled to sensors 155, a memory 157, and a communication module 159. The number of sensors 155 included as part of the electronic circuit 151 depends upon the types of properties to be detected and the functionality of each type of sensor employed. Properties may include, for example, position, motion, acceleration, frequency, and pressure against the surface of the teeth. Other types of properties associated with a brushing routine may also be detected, and those listed herein are not to be limiting of the invention unless otherwise indicated in the claims. In certain embodiments, only one sensor 155 may be included as part of the electronic circuit 151, and in other embodiments, two or more sensors 155 may be included. By way of example, the at least one sensor 155 may be any one or more of the following: an accelerometer, a gyroscope, a magnetometer, a pressure sensor, among other types of sensors. In general, each sensor 155 included as part of the electronic circuit 151 generates a sensor signal which includes sensor data that corresponds to the brushing activity of the user. Sensor data may form part of brushing data indicative of brushing activity. For purposes of the present disclosure, the term "sensor data" is any type of information which may be extracted or derived from the sensor or sensor signal, regardless of the form of the extracted information. By way of example, sensor data may be in the form of mathematical data (such as a formula which mathematically represents at least part of the sensor signal), analog data (such as the waveform of the sensor signal), and/or digital data (such as a representation of at least part of the sensor signal in a digital format). In addition to sensor data, brushing data may include any data related to or indicative of brushing activity, including data indicative of how often the toothbrush was turned on, and/or how long it was turned on. In certain embodiments, the processor 153 and the memory 157 may be omitted from the electronic circuit 151 of the toothbrush 103. In such embodiments, sensor data and other brushing data may be communicated directly to the communication module for transmission.

The memory 157 may be any appropriate type of memory or storage which enables the processor 153 to perform the desired programming, such as volatile and/or non-volatile random access memory, or any other type of storage. The particular type of storage used for the memory 157 is not to be limiting of the invention. The communication module 159 may include an antenna for wireless communication. The communication module 159 may be configured and/or programmed to communicate using a wireless technology standard such as Wi-Fi, Bluetooth®, and the like, or it may communicate using any type of proprietary wireless transmission protocol. In certain embodiments, the communication module 159 may include a port to enable communications using wires and wired protocols, such as USB and the like. The particular mode of communication used by the communication module is not limiting of the invention unless specifically set forth in a claim.

It is understood that there are various "smart" toothbrushes for tracking brushing activity. This application incorporates by reference its entirety each of the following commonly-owned applications: U.S. patent application Ser. Nos. 13/350,223, 15/350,254, 15/350,266, 15/350,285, and 15/350,298. It is understood that any of the technologies disclosed in these applications may be used with the toothbrushes and electronic devices discussed herein.

Figure 7B:
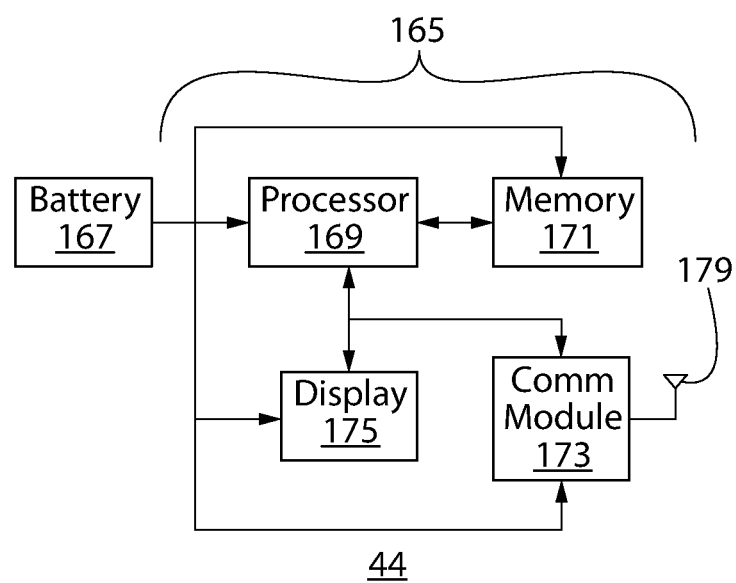
FIG. 7B is a block diagram of the components of the electronic device according to one embodiment of the present invention.

FIG. 7B is a block diagram of components of the electronic device 44 according to one embodiment of the present invention. The electronic device 44 includes an electronic circuit 165 coupled to a power source 167, shown as a battery in the exemplary embodiment. Of course, the invention is not so limited, and other types of power sources may be used. The electronic circuit 165 includes a processor 169 communicably coupled to a memory 171, a communication module 173, and a display 175. In certain embodiments, the electronic circuit 165 may include other components, such as a speaker to provide audible feedback to the user, one or more buttons to receive input from the user, and one or more ports for making a wired connection between the electronic circuit 165 and other circuit external to the electronic device 44. In the exemplified embodiment the electronic device 44 is a smartphone, but in other embodiments it may be, for example, a tablet computer, a laptop computer, or a desktop computer.

The exemplified memory 171 may be any appropriate type of memory or storage which enables the processor 169 to perform the desired programming, such as volatile and/or non-volatile random access memory. The particular type of storage used for the memory 171 is not to be limiting of the invention.

The exemplified display 175 may be any type of light emitting display, and as shown in the exemplary embodiment, the display 175 may be an LED panel. In certain other embodiments, the display 175 may be an LCD panel, an OLED panel, or any other type of display which is electronically controllable by the processor 169 to provide visual feedback to the user. In certain embodiments, the display 175 may be a touch sensitive display which accepts input from the user directly on the display surface. The type and configuration of the display 175 is not limiting of the invention unless specifically set forth in a claim.

The exemplified communication module 173 includes an antenna 179 to enable wireless transmission. The communication module 173 may be configured and/or programmed to communicate using a wireless technology standard such as Wi-Fi, Bluetooth®, and the like, or it may communicate using any type of proprietary wireless transmission protocol. The mode of communication for which the communication module 173 is configured is not limiting of the invention unless specifically set forth in a claim. In certain embodiments, the communication module 173 may include a port to enable communications using wires and wired protocols, such as USB and the like. For proper functioning of the exemplary embodiment, the communication module 159 of the toothbrush 45 and the communication module 173 of the electronic device 44 communicate with each other, whether such communications are wireless or wired, using the same communication protocol.

The communication module 173 of the electronic device 44 may also be configured and/or programmed to communicate with the server 41. The communication module 173 may communicate with the server 41 over any combination of public and/or private network, and the communications may be wired, wireless, or a combination of the two. In certain embodiments, the communication module 173 may communicate with the server 41 over the Internet using one or more types of communication protocols. In certain embodiments, the server 41 may be programmed with an application programming interface (API) which provides server-side functionality to the electronic device 44.

In the exemplary embodiment, the processor 153 of the toothbrush 103 may be programmed with functionality to analyze the sensor data generated by the sensors 155 or other brushing data. Similarly, the processor 169 of the electronic device 44 may be programmed with functionality to analyze the sensor data generated by the sensors 155 or other brushing data.

Figure 8:
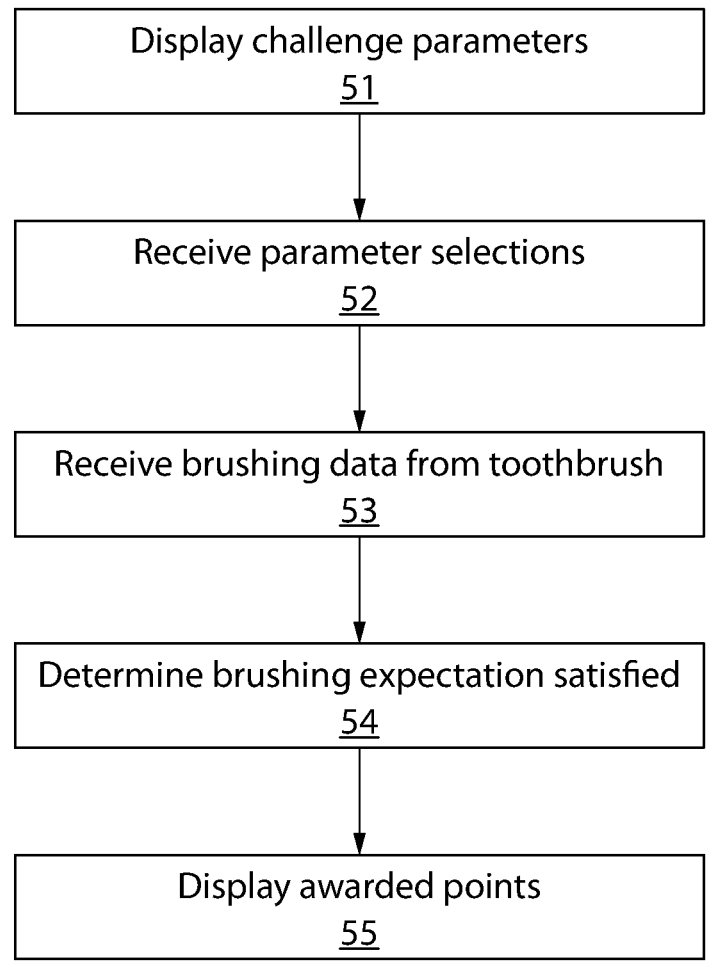
FIG. 8 is a flow chart for a method of providing a brushing challenge according to one embodiment of the present invention.

FIG. 8 is a flow chart for a method 50 of providing a brushing challenge according to one embodiment of the present invention. In the exemplified method, a user interface displays to a user of an electronic device challenge parameters for creating a personal brushing challenge (operation 51), the challenge parameters including a type of challenge and a challenge period. The user inputs, via the user interface, a parameter selection for each of the challenge parameters (e.g., coverage for the type of challenge, and 14 days for the challenge period) (operation 52). Each combination of parameter selections has a corresponding brushing expectation and point value. The electronic device then receives brushing data indicative of user brushing activity (operation 53). In one embodiment, the electronic device receives the brushing data from an electronic toothbrush configured to track brushing activity, though the invention is not so limited. In other embodiments, for example, the user may input his brushing data into the electronic device using the user interface. The electronic device determines, based on the brushing data, whether the user satisfied the brushing expectation corresponding with the combination of parameter selections (operation 54). If the user satisfied the oral expectation, the user interface displays that the corresponding point value has been awarded to the user (operation 55).

It is noted that while the above embodiments discuss providing a brushing challenge, the invention is not limited to brushing challenges. For example, another oral care challenge (such as a flossing challenge) may be provided. Similar to a brushing challenge, a flossing challenge may be based on flossing coverage, duration, or streak, have differing intensity levels (e.g., easy and hard), and having challenge periods of different lengths, each combination having a corresponding point value. Other oral care challenges could be related to whitening treatments, breath treatments, or any other type of oral care practice. It is further noted that the methods described above may be carried out using a non-transitory computer-readable storage medium encoded with instructions which, when executed on a processor, perform one of the disclosed methods.

The disclosed systems and methods provide several advantages. For example, the disclosed method allows a user to set a personal challenge based on specific, user-selected parameters. In one embodiment, in addition to being able to select the type of challenge, the user can select how long the challenge lasts and an intensity level, and thereby affect the amount of points that can be awarded. Such options provide added personalization, which users increasingly desire. Further, the disclosed system can use a compatible electronic toothbrush for tracking brushing activity, enabling the toothbrush to automatically track brushing performance, thereby providing added convenience and data accuracy.

While the inventions have been described with respect to specific examples including presently preferred modes of carrying out the inventions, those skilled in the art will appreciate that there are numerous variations and permutations of the above described systems and techniques. It is to be understood that other embodiments may be utilized and structural and functional modifications may be made without departing from the scope of the present inventions. Thus, the spirit and scope of the inventions should be construed broadly as set forth in the appended claims.

What is claimed is:

1. A system for providing a personal brushing challenge, the system comprising:
    a toothbrush comprising:
        at least one tooth cleaning element; and
        a processor for generating brushing data indicative of user brushing activity; and
    an electronic device comprising a processor configured to perform the steps of:
        displaying to a user of an electronic device, via a user interface, challenge parameters for creating a personal toothbrushing challenge, the challenge parameters including a type of challenge and a challenge period;
        receiving from the user, via the user interface, a parameter selection for each of the challenge parameters, each of the parameter selections being individually selectable by the user via the user interface from a plurality of selectable parameter selections to form a user-selected combination of parameter selections, the user-selected combination of parameter selections having a corresponding brushing expectation and point value;
        receiving the brushing data from the toothbrush;
        determining based on the brushing data, whether the user satisfied the brushing expectation corresponding with the user-selected combination of parameter selections; and
        upon determining that the user satisfied the brushing expectation, displaying to the user, via the user interface, that the corresponding point value has been awarded to the user;
        wherein the parameter selection for the type of challenge is selected from a group comprising a duration challenge, a coverage challenge and a streak challenge.

2. The system of claim 1:
    wherein the toothbrush comprises at least one sensor configured to detect location or motion of the toothbrush within an oral cavity of the user and generate brushing data corresponding to the detected location or motion; and
    wherein the type of challenge is a coverage of the oral cavity.

3. The system of claim 2 wherein the sensor comprises an accelerometer or gyroscope.

4. The system of claim 3 wherein the sensor comprises a 3-axis accelerometer.

5. The system of claim 1 wherein the challenge parameters further include a challenge level.

6. The system of claim 1 wherein the parameter selection for the challenge period is selected from a group comprising at least 3 different time periods.

7. A non-transitory computer-readable storage medium encoded with instructions which, when executed on a processor, perform a method of:
    displaying to a user of an electronic device, via a user interface, challenge parameters for creating a personal oral care challenge, the challenge parameters including a type of challenge and a challenge period;
    receiving from the user, via the user interface, a parameter selection for each of the challenge parameters, each of the parameter selections being individually selectable by the user via the user interface to form a user-selected combination of parameter selections, the parameter selections being individually selectable, the user-selected combination of parameter selections having a corresponding oral care expectation and point value;

receiving, at the electronic device, oral care data indicative of user oral care activity;

determining, at the electronic device, based on the oral care data, whether the user satisfied the oral care expectation corresponding with the user-selected combination of parameter selections; and upon determining that the user satisfied the oral expectation, displaying to the user, via the user interface, that the corresponding point value has been awarded to the user;

wherein the type of challenge is selected from a group comprising a duration challenge, a coverage challenge and a streak challenge.

8. The storage medium of claim 7 wherein the oral care challenge is a brushing challenge.

9. The storage medium of claim 7 wherein the oral care challenge is a flossing challenge.

10. The storage medium of claim 7 wherein the challenge parameters further include a challenge level.

11. The storage medium of claim 7 wherein the parameter selection for the challenge period is selected from a group comprising at least 3 different time periods.

12. A method for providing an oral care challenge via an application of an electronic device, the method comprising:

displaying to a user of an electronic device, via a user interface, challenge parameters for creating a personal oral care challenge, the challenge parameters including a type of challenge and a challenge period;

receiving from the user, via the user interface, a parameter selection for each of the challenge parameters, each of the parameter selections being individually selectable by the user via the user interface to form a user-selected from a plurality of selectable parameter selections to form a user-selected combination of parameter selections, the parameter selections being individually selectable, the user-selected combination of parameter selections having a corresponding oral care expectation and point value;

receiving, at the electronic device, oral care data indicative of user oral care activity;

determining, at the electronic device, based on the oral care data, whether the user satisfied the oral care expectation corresponding with the combination of parameter selections; and upon determining that the user satisfied the oral expectation, displaying to the user, via the user interface, that the corresponding point value has been awarded to the user;

wherein the type of challenge is selected from a group comprising a duration challenge, a coverage challenge and a streak challenge.

13. The method of claim 12 wherein the oral care challenge is a brushing challenge.

14. The method of claim 12 wherein the oral care challenge is a flossing challenge.

15. The method of claim 12 wherein the challenge parameters further include a challenge level.

16. The method of claim 12 wherein the parameter selection for the challenge period is selected from a group comprising at least 3 different time periods.

\* \* \* \* \*